2,715,600

N,N'-(3-NITRO-BENZENE-SULFONYL)ETHYLENE-DIAMINE COMPOSITIONS FOR THE TREATMENT OF COCCIDIOSIS

Thomas W. Zbornik, Neal F. Morehouse, and Arthur W. Walde, Charles City, Iowa, assignors to Dr. Salsbury's Laboratories, Charles City, Iowa, a corporation of Iowa No Drawing. Application February 24, 1953,
Serial No. 338,566

2 Claims. (Cl. 167—53.1)

This invention relates to chemotherapeutic compositions adapted for the prevention and cure of coccidiosis in chickens, and more particularly pertains to the control of those two types of the disease which are produced by the protozoan parasites *Eimeria tenella* and *Eimeria necatrix*.

*Eimeria tenella* is resposible for the form of coccidiosis which is generally known as the cecal type. The infectious organism invades the intestinal tract of the bird in its oosporic stage, called oocyst, which is found in the droppings and in feed contaminated therewith. In the digestive system of the host the parasite undergoes its natural life cycle, rapidly multiplies and, after release of its sporozoites, erodes the epithelial tissue of the cecum and small intestine, thereby causing hemorrhage, unthriftiness, weakness, emaciation and death. Mortality due to cecal occidiosis in chickens during the first month of life has been estimated at 10 to 20%.

*Eimeria necatrix* colonizes the small intestines involving the middle part of the canal. The pathological conditions developed by this infection may be either of acute or chronic nature. Hemorrhage is the most prevalent and salient sympton of the disorder and usually becomes fatal to the bird five or seven days following infection. The chronic form leads to marasmus and progressive emaciation.

While coccidiostatic remedies heretofore known are ordinarily very specific to the type of organism involved, we have discovered a compound to which both species of Eimeriae are responsive with equal effect. The substance may be designated as N,N'-(3-nitro-benzene-sulfonyl) ethylenediamine and is identified by the following formula

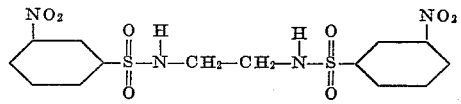

which may be prepared in accordance with the method described in the Journal of the Chemical Society (1905), vol. 87, pp. 381–388. The chemical characteristics of the compound are disclosed on page 387 of said publication.

The therapeutic effect of the drug is manifested both by the suppression of hemorrhage and the prevention of mortality, whereby the infection is checked before its severe ravages destroy the entire flock.

The compound is administered preferably by way of medicated feed. Incipient potency has been found at a level of 0.01% by weight of the food ration, with higher amounts being required for the cure of heavy infections. In the feed the material is palatable and without toxic reactions to an extent of 0.25%. Ratios higher than 0.25% have increasing toxicity and should therefore not be used.

In the following examples the coccidiostatic activity of the compound will be illustrated by the degree in which losses are prevented and hemorrhage is reduced by a scheduled treatment with the medicated diet starting one to three days before artificial infection. A number of birds, mostly of the New Hampshire variety, were segregated into groups of four, one of which was denied medication and served as control, while the remaining groups received a basal ration mixed with varying concentrations of the therapeutic agent. Within one to three days of the beginning of the regime all the animals were infected with 100,000 to 200,000 oocysts of *Eimeria tenella* or *Eimeria necatrix* and medication was continued for a period of six to thirteen days. Observations were directed to the degree of hemorrhage, toxicity and mortality rate.

The degree of hemorrhage is evidenced by the amount of blood found in the droppings and can be easily evaluated by a skilled worker in the art of veterinary medicine. It is indicated by the letter B in accordance with the following code:

B— slight
BB— moderate
BBB— severe
BBBB—very severe

The rate of suppression or mitigation of hemorrhage is expressed in percentage calculated in the following manner. The peak of bloody droppings usually appears on the fifth or sixth day after infection and serves as basis of comparison. All the B's assigned to the droppings of the treated and untreated groups on that critical day are added up respectively. The total B's of the test group divided by the total B's of the controls, multiplied by 100 yields the percentage of persisting hemorrhage which, when subtracted from 100 gives the degree of suppression attained. If, for instance, on a given day the maximum number of B's in the treated group is 7, and that of the controls is 16, the amount of persisting hemorrhage is $$\frac{7}{16} \times 100 = 44\%$$

and the extent of prevention is 100%−44%=56%.

In the *Eimeria necatrix* tests the hemostatic effect is measured in terms of derivations of the droppings from their normal appearance during the experimental period. They can be readily determined by every skilled veterinarian. In addition the quantity of blood observation also includes the amount of mucus seen in the eliminates. The deviations are designated by the following code:

O— none
B— slight
BB— moderate
BBB— severe
BBBB—very severe

In the following tables, column 1 records the number of birds used in the various test groups. It is followed by the dosage added to the feed and the schedule of treatment expressed in an abbreviated symbol, such as 3 IF(13) which means that treatment was begun three days before infection and continued for 13 consecutive days. The reduction of hemorrhage is indicated in percentages in the *Eimeria tenella* tests, and recorded in code form for *Eimeria necatrix* infections. Thus, for example, the symbol 1 BB, 2 BBB, 1 BBBB will indicate that out of four experimental animals treated with a medicated feed of a given concentration one showed a slight, two a severe, and the fourth one a very severe deviation. The next column registers the degree of toxicity, NT meaning nontoxic and ST standing for slightly toxic. Mortality is given in percentages in both tables.

TABLE I

*Effect of N,N'-(3-nitrobenzene-sulfonyl)ethylenediamine on Eimeria tenella infections*

| No. Birds | Conc. Feed, Percent | Treatment Schedule | Reduction of Hemorrhage, Percent | Toxicity | Mortality, Percent |
|---|---|---|---|---|---|
| 4 | 0.100 | 3 IF (11) | 70 | NT | 0 |
| 4 | 0.050 | 3 IF (11) | 20 | NT | 0 |
| 4 | 0.025 | 3 IF (11) | 0 | NT | 0 |
| Contr. | | | 0 | | 75 |
| 4 | 0.100 | 3 IF (11) | 100 | NT | 0 |
| 4 | 0.075 | 3 IF (11) | 100 | NT | 0 |
| 4 | 0.050 | 3 IF (11) | 75 | NT | 0 |
| Contr. | | | 0 | | 75 |
| 4 | 0.250 | 1 IF (7) | 100 | ST | 0 |
| 4 | 0.100 | 1 IF (7) | 100 | NT | 0 |
| 4 | 0.025 | 1 IF (7) | 60 | NT | 0 |
| 4 | 0.010 | 1 IF (7) | 0 | NT | 0 |
| Contr. | | | 0 | | 25 |

TABLE II

*Effect of N,N'-(3-nitrobenzene-sulfonyl)ethylenediamine on Eimeria necatrix infections*

| No. Birds | Conc. Feed, Percent | Treatment Schedule | Reduction of Hemorrhage | Toxicity | Mortality, Percent |
|---|---|---|---|---|---|
| 4 | 0.1000 | 3 IF (13) | 4B | NT | 0 |
| 4 | 0.0500 | 3 IF (13) | 1BB, 2BBB, 1BBBB | NT | 0 |
| 4 | 0.0250 | 3 IF (13) | 4BBBB | NT | 0 |
| Controls | | | 4 dead | | 100 |
| 4 | 0.0750 | 3 IF (13) | 2B, 2(O) | NT | 0 |
| 4 | 0.0500 | 3 IF (13) | 1B, 2BB, 1BBB | NT | 0 |
| 4 | 0.0250 | 3 IF (13) | 2BB, 1BBB, 1BBBB | NT | 0 |
| 4 | 0.0125 | 3 IF (13) | 2BBB, 2BBBB | NT | 0 |
| Controls | | | 1 dead, 3BBBB | | 25 |
| 4 | 0.2000 | 1 IF (6) | 4(O) | ST | 0 |
| 4 | 0.1500 | 1 IF (6) | 4(O) | NT | 0 |
| 4 | 0.1000 | 1 IF (6) | 2B, 2(O) | NT | 0 |
| 4 | 0.0100 | 1 IF (6) | 4BBBB | NT | 0 |
| Controls | | | 1 dead, 3BBBB | | 25 |
| 4 | 0.1000 | 3 IF (14) | 2(O), 2B | NT | 0 |
| 4 | 0.0750 | 3 IF (14) | 1(O), 2B, 1BB | NT | 0 |
| 4 | 0.0500 | 3 IF (14) | 3B, 1BBB | NT | 0 |
| Controls | | | 2 dead, 2BBBB | | 50 |

As will be seen from the foregoing tables, mortality losses are prevented and hemorrhage is alleviated at such low a level as 0.01%. When the infection has taken hold and treatment was delayed, higher dosages will be required and the schedule of treatment will have to be continued for several days until the droppings more closely aproach normal appearance.

Although the birds may also be given the drug in individual unitary doses of at least 13 mg./kg. body weight per day, our preferred manner of treatment is to allow the animals to feed ad libitum on a medicated ration containing the compound in the approximate above specified concentrations. The substance is conveniently incorporated into the diet by first mixing the same with a small amount of an inert carrier like fuller's earth or bentonite or any similar colloidal clay. This mixture is then introduced into the basal ration with thorough stirring and shuffling until a uniform blend of even distribution results.

What we claim is:

1. A medicated feed effective in the control of coccidiosis in chickens, containing N,N'-(3-nitro-benzene-sulfonyl)ethylenediamine as the active ingredient.

2. A medicated feed effective in the control of coccidiosis in chickens, containing at least 0.01% by weight of N,N'-(3-nitro-benzene-sulfonyl)ethylenediamine.

References Cited in the file of this patent

UNITED STATES PATENTS 2,531,755     Waletzky     Nov. 28, 1950

OTHER REFERENCES

Hager et al., J. A. P. A. (Scientific Ed.), vol. 42, No. 1, January 1953, pp. 9 to 12.

Amundsen et al., J. Am. Chem. Soc., vol. 68, April 1946, pp. 584 and 585.